United States Patent
Chang

(10) Patent No.: US 7,295,369 B2
(45) Date of Patent: Nov. 13, 2007

(54) FABRICATION METHOD FOR REAR-PROJECTION SCREEN

(75) Inventor: Shih-Shiun Chang, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 207 days.

(21) Appl. No.: 11/013,477

(22) Filed: Dec. 17, 2004

(65) Prior Publication Data
US 2005/0185271 A1  Aug. 25, 2005

(30) Foreign Application Priority Data
Feb. 25, 2004  (TW) .............................. 93104806 A

(51) Int. Cl.
*G03B 21/56* (2006.01)
(52) U.S. Cl. .................... 359/443; 359/456; 359/457
(58) Field of Classification Search ............... 359/460, 359/455–457, 443; 356/450, 495, 489, 511, 356/512, 521; 250/550, 227
See application file for complete search history.

(56) References Cited

U.S. PATENT DOCUMENTS

| 6,154,247 | A * | 11/2000 | Marino et al. ............ 347/256 |
| 6,594,079 | B1 * | 7/2003 | Trott et al. ............... 359/456 |
| 7,006,231 | B2 * | 2/2006 | Ostrovsky et al. ......... 356/479 |
| 2004/0114229 | A1 * | 6/2004 | Sakaguchi ................. 359/460 |
| 2006/0001961 | A1 * | 1/2006 | Gibilini ..................... 359/456 |

* cited by examiner

*Primary Examiner*—W. B. Perkey
*Assistant Examiner*—Robert Do
(74) *Attorney, Agent, or Firm*—Birch, Stewart, Kolasch & Birch, LLP

(57) ABSTRACT

A fabrication method for a rear-projection screen includes the steps of providing a light source and a lenticular lens sheet; projecting parallel light onto the lenticular portions of a lenticular lens sheet to make one surface of the lenticular lens sheet opposite to the lenticular portions have a plurality of bright and dark areas located thereon; detecting the locations of the bright and dark areas on the surface of the lenticular lens sheet opposite to the lenticular portions; and spreading an opaque material on all the dark areas.

14 Claims, 4 Drawing Sheets

FABRICATION METHOD FOR REAR-PROJECTION SCREEN

BACKGROUND OF THE INVENTION (a) Field of the Invention

The present invention relates to a fabrication method for a rear-projection screen and, more particularly, to a fabrication method capable of improving the manufacturing accuracy of the light-shielding layer in a rear-projection screen.

(b) Description of the Related Art

Referring to FIG. 1A, a conventional rear-projection screen includes a Fresnel lens 102 and a lenticular lens sheet 104. The light emitted from a projection lens is aligned as parallel light after passing through the Fresnel lens 102, and, after further refracting on the lenticular portions 104a of the lenticular lens sheet 104, the parallel light is focused on the planar surface of the lenticular lens sheet 104 opposite to the lenticular portions 104a to thereon form an image sensed by human eyes.

FIG. 1B shows a perspective view of a rear-projection screen 100, where black colored strips 108 functioning as a light-shielding layer are clearly illustrated.

When illuminating the lenticular portions 104a, the parallel light is concentrated as a plurality of bright stripes on the planar surface of the lenticular lens sheet 104. Hence, a light-shielding layer, such as the black colored strips 108, is need to cover all the planar surface of the lenticular lens sheet 104 except the regions on which the bright stripes are located, preventing stray light from striking the lenticular lens sheet 104 to improve image contrast.

FIGS. 2A to 2E show sectional plan views illustrating the conventional steps in forming a lenticular lens sheet 104 with a light-shielding layer.

First, as shown in FIG. 2A, a substrate 114 having lenticular portions 112 on one surface is prepared. Next, as shown in FIG. 2B, a light-curing resin layer 116 is applied on the planar surface of the substrate 114 opposite to the lenticular portions 112. Then, the planar surface of the substrate 114 is vertically irradiated from the lenticular portions 112 side with ultraviolet (UV) rays 118 extending in the longitudinal direction of the lenticular portions 112, as shown in FIG. 2C. Hence, parts of the resin layer 116 are cured corresponding to the locations at which light is focused by the lenticular portions 112 acting as a cylindrical lens. Cured layers 116a and uncured layers 116b are both formed in the resin layer 116.

Subsequently, referring to FIG. 2D, a transfer sheet 122 having a black colored layer 120 is overlaid on the entire planar surface of the substrate 114, and the black colored layer 120 is caused to stick to only the uncured layers 116b due to their adhesion. Finally, as shown in FIG. 2E, the transfer sheet 122 is peeled from the substrate 114 to remove parts of the black colored layer 120 correspond to the cured layers 116a. With this process, a light-shielding layer consisting of black colored strips 124 is formed corresponds to the uncured layers 116b.

However, this method is liable to result in an alignment error in the formation of the black colored strips 124, particularly under the fabrication of a large-sized screen. Also, when the black colored layer 120 is peeled from the transfer sheet 122, the resulting shear force may cause the black colored strips 124 to have an uneven edge to lower their shielding effect. Once there is a need for enhancing image resolution by diminishing the interval between two adjacent projections of the lenticular portions 112, the defects mentioned above will become more apparent.

Further, a large-scale rolling machine is needed to combine all optical layers, such as the light-curing resin layer 116 and the black colored layer 120, thus resulting in a high manufacturing cost.

BRIEF SUMMARY OF THE INVENTION

In view of this, an object of the invention is to provide a fabrication method for a rear-projection screen capable of improving the manufacturing accuracy of the light-shielding layer in a rear-projection screen and solving aforesaid problems existing in conventional fabrication methods.

The subject invention describes a fabrication method for a rear-projection screen, which comprises the steps of providing a light source and a lenticular lens sheet; projecting parallel light onto the lenticular portions of a lenticular lens sheet to make one surface of the lenticular lens sheet opposite to the lenticular portions have a plurality of bright and dark areas located thereon; detecting the locations of the bright and dark areas on the surface of the lenticular lens sheet opposite to the lenticular portions; and spreading an opaque material on the dark areas. The light source may include a Fresnel lens opposite to the lenticular lens sheet.

Through the design of the invention, since the opaque material is directly applied on all the dark areas that have been precisely defined, the manufacturing accuracy of the light-shielding layer in a rear-projection screen is considerable improved and sufficient to meet the critical accuracy requirement under high image resolution. Further, once the fabrication of a large-sized rear-projection screen is needed, the method according to the invention can maintain the same accuracy simply by increasing the area to be scanned, without the need of a large-scale rolling machine used in conventional methods.

Further, since the invention is designed to have the incoming light propagate along a simulated path similar to the actual projection path created by the optics configuration of a projection system before illuminating the Fresnel lens, the bright and dark areas defined on the surface are the same as the real ones that appear thereon as the screen is mounted on a rear-projection TV. Therefore, the region on which the opaque material is applied can exactly overlap the dark areas that appear as the screen is mounted on a rear-projection TV, without any deviation or alignment error. Moreover, the areas on which the opaque material is to be applied can be adjusted simultaneously with any possible change in the projection path to improve the manufacturing flexibility.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1A:
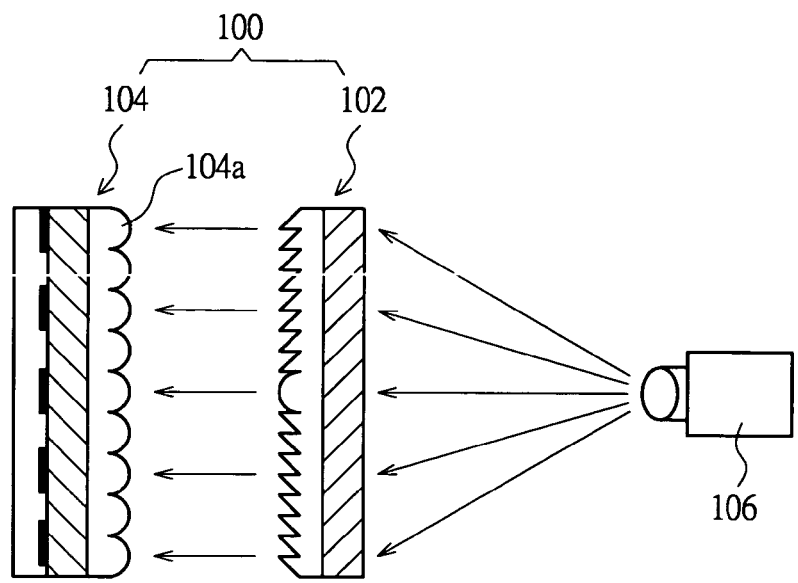
FIG. 1A is a schematic diagram illustrating a conventional rear-projection screen.
Figure 1B:
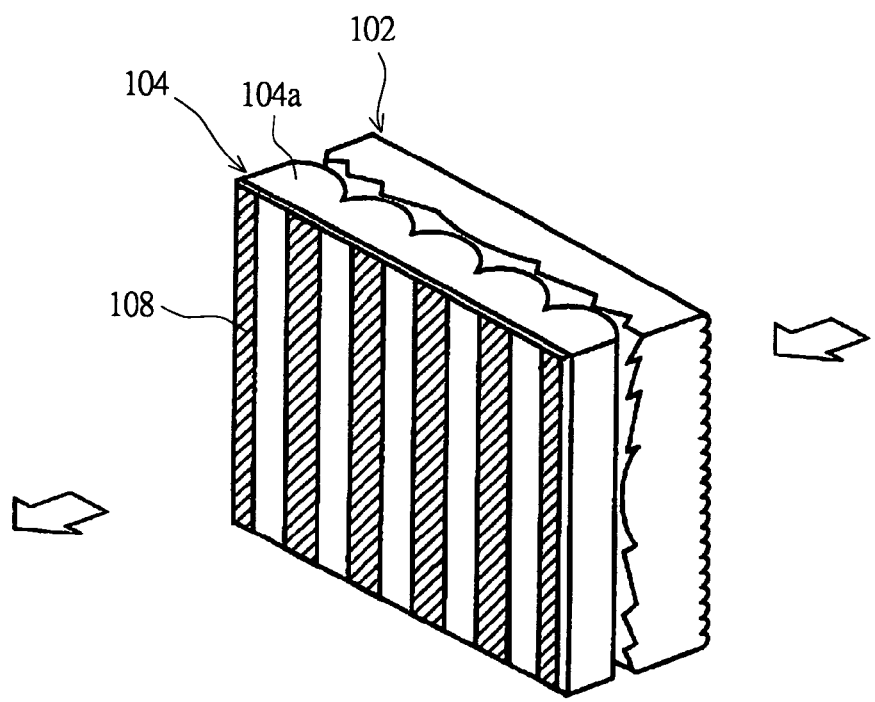
FIG. 1B shows a perspective view of a rear-projection screen.
Figure 2A:
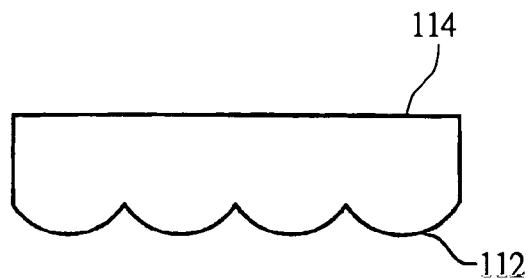
FIGS. 2A to 2E show sectional plan views illustrating the conventional steps in forming a lenticular lens sheet with a light-shielding layer.
Figure 2B:
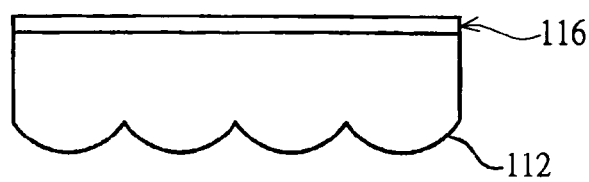
Figure 2C:
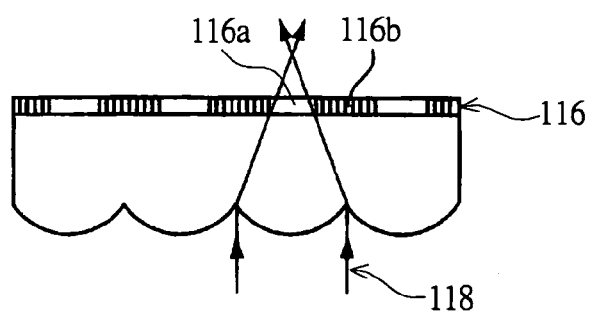
Figure 2D:
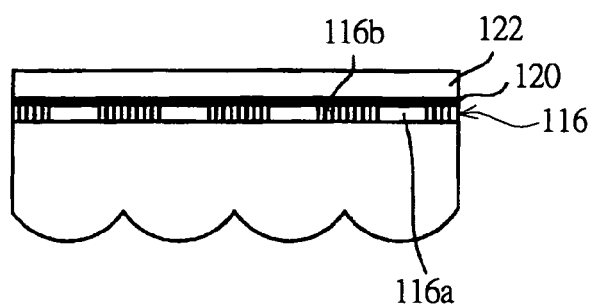
Figure 2E:
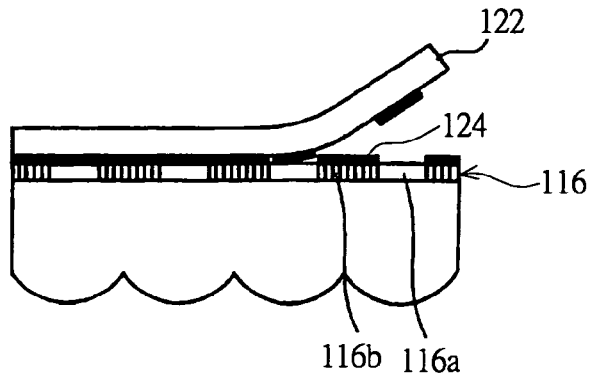
Figure 3:
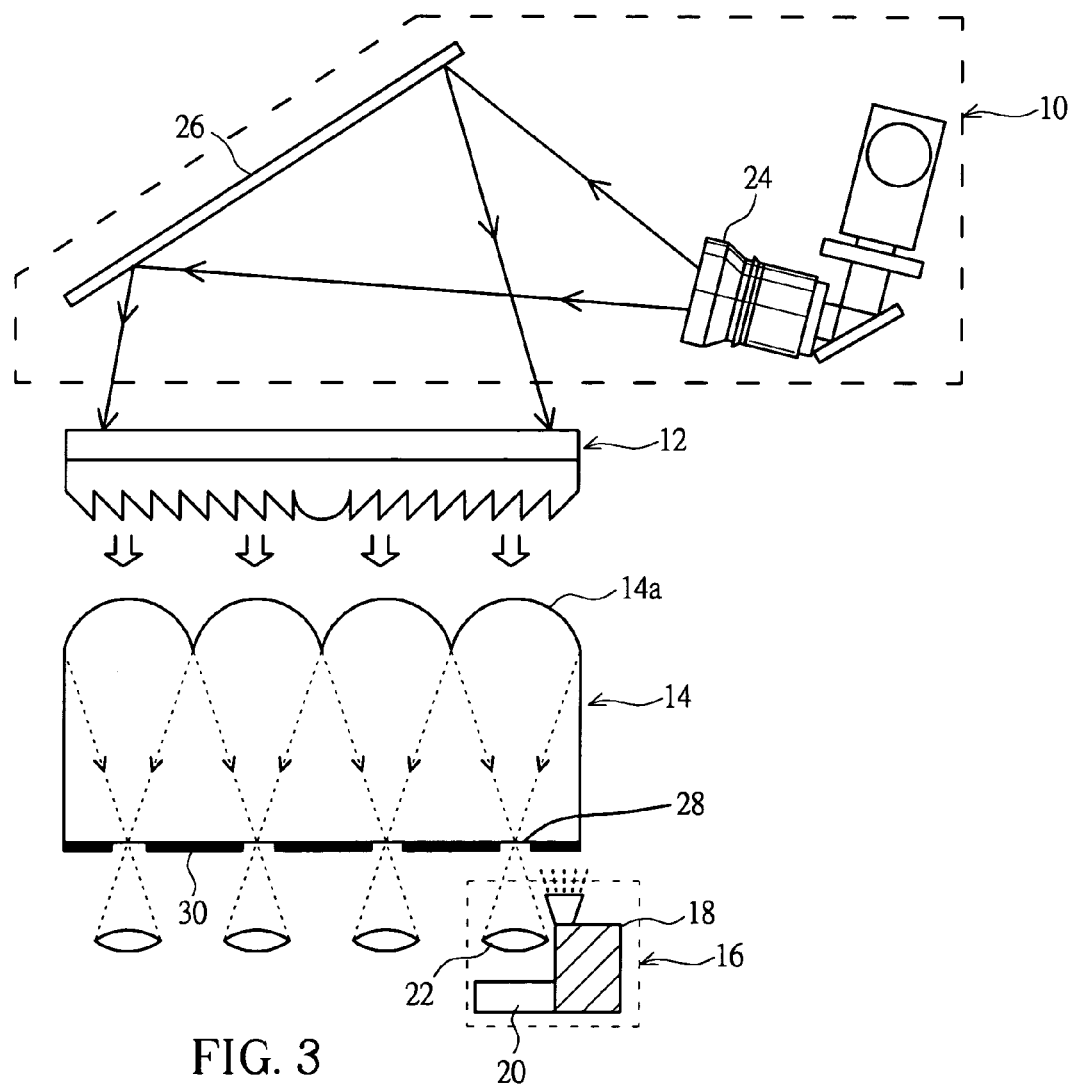
FIG. 3 shows a schematic view illustrating a fabrication method for a rear-projection screen with a light-shielding layer according to an embodiment of the invention.

FIG. 3 shows a schematic view illustrating a fabrication method for a rear-projection screen with a light-shielding layer according to an embodiment of the invention.

According to this embodiment, the first step is to provide a Fresnel lens 12 and a lenticular lens sheet 14 opposite to the Fresnel lens 12 for incoming light sequentially passing therethrough.

The rear-projection screen is used to display projection images formed from an optical system, such as a projection system for a rear-projection TV. Hence, according to this embodiment, before illuminating the Fresnel lens 12, the incoming light may propagate along a simulated path similar to the actual projection path created by the optics configuration of a projection system 10 for a rear-projection TV, as shown in the top portion of FIG. 3. Noted that the optics configuration shown in the figure is simplified for illustrative purpose, and the simulated path is adaptable basing on which type of projection system and rear-projection TV the screen is incorporated into.

Referring to FIG. 3, along the simulated path, the light is emitted from a projection lens 24 and reflects off a mirror 26 and then illuminates the Fresnel lens 12, where the projection lens 24 and the Fresnel lens 12 constitute a light source for delivering parallel light onto the lenticular lens sheet 14. After passing through the Fresnel lens 12, the light is aligned as parallel light, and the parallel light subsequently illuminates the lenticular portions 14a of the lenticular lens sheet 14. The parallel light refracts on the lenticular portions 14a of the lenticular lens sheet 14 and is then focused on one surface 28 of the lenticular lens sheet 14 opposite to the lenticular portions to make the surface 28 have a plurality of bright and dark areas alternately located thereon. The bright and dark areas may be shaped like stripes.

Figure 4:
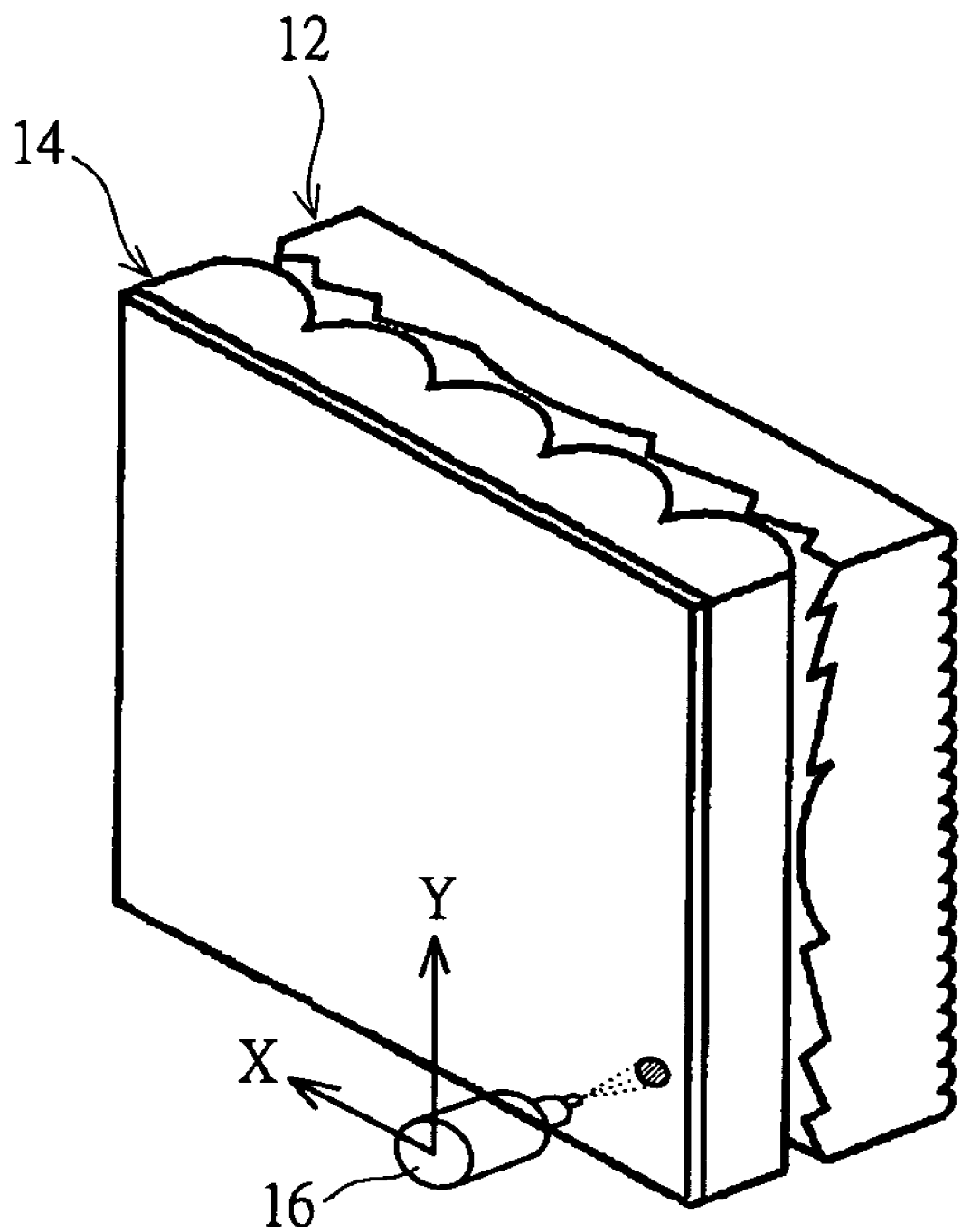
FIG. 4 shows a schematic view illustrating the movement of a jet system according to the invention.

Then, a jet system 16 including an inkjet device 18 and a light-sensing device 20 is used to form the light-shielding layer in the rear-projection screen according to the invention. Referring to FIG. 4, the jet system 16 is able to move at least along the X-axis and Y-axis to completely scan the surface 28 of the lenticular lens sheet 14. When scanning, the light-sensing device 20 detects the respective brightnesses of the bright and dark areas to distinguish the former from the latter. As the light-sensing device 20 detects the high brightness of the bright areas, the bright areas are marked as "non-inked" areas; while the dark areas with low brightness are marked as "inked" areas. After a complete scan, the locations of the bright and dark areas on the surface 28 are all precisely recognized. Hence, when the jet system 16 moves to the "inked" areas, an opaque material carried on its inkjet device 18 is precisely spread on all the dark areas to form black colored stripes 30 functioning as the light-shielding layer.

Further, since the light-sensing device 20 receives the light passing through the lenticular lens sheet to detect the locations of the bright and dark areas, the light may be focused by a lens set 22 before entering the light-sensing device 20 to enhance the sensibility of the light-sensing device 20 with respect to the bright and dark areas. The light-sensing device 20 may be a charge-coupled device (CCD) or a photo-detector (PD). Also, the number or arrangement of the inkjet device 18 is not limited and may be changed according to screen size or other fabrication demand.

Through the design of the invention where the inkjet device 18 and light-sensing device 20 are incorporated with each other, since the inkjet device 18 can directly spray the opaque material to fill the dark areas that have been precisely defined by the light-sensing device 20, the manufacturing accuracy of the light-shielding layer in a rear-projection screen is considerable improved and sufficient to meet the critical accuracy requirement under high image resolution. Further, once the fabrication of a large-sized rear-projection screen is needed, the method according to the invention can maintain the same accuracy simply by increasing the area to be scanned, without the need of a large-scale rolling machine used in conventional methods.

On the other hand, since the invention is designed to have the incoming light propagate along a simulated path similar to the actual projection path created by the optics configuration of a projection system 10 before illuminating the Fresnel lens 12, the bright and dark areas defined on the surface 28 are the same as the real ones that appear thereon as the screen is mounted on a rear-projection TV. Therefore, the region on which the opaque material is applied can exactly overlap the dark areas that appear as the screen is mounted on a rear-projection TV, without any deviation or alignment error.

Further, through the design of the invention, the areas on which the opaque material is to be applied can be adjusted simultaneously with any possible change in the projection path to improve the manufacturing flexibility.

While the invention has been recited by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A fabrication method for a rear-projection screen, comprising the steps of:
   providing a light source and a lenticular lens sheet;
   projecting a light generated from the light source onto lenticular portions of a lenticular lens sheet to make one surface of the lenticular lens sheet opposite to the lenticular portions have a plurality of bright and dark areas located thereon;
   detecting the locations of the bright and dark areas on the surface of the lenticular lens sheet opposite to the lenticular portions by a light-sensing device; and
   spreading an opaque material on the dark areas, but not on the bright areas.

2. The fabrication method as recited in claim 1, wherein the light source includes a Fresnel lens for paralleling the light.

3. The fabrication method as recited in claim 1, wherein the light-sensing device is a charge-coupled device (CCD).

4. The fabrication method as recited in claim 1, wherein the light-sensing device is a photo-detector (PD).

5. The fabrication method as recited in claim 1, wherein the light-sensing device receives the light passing through the lenticular lens sheet to detect the locations of the bright and dark areas, and the light is focused by a lens set before entering the light-sensing device.

6. The fabrication method as recited in claim 1, wherein the opaque material is ink, and the ink is spread on the dark areas by an inkjet device.

7. A fabrication method for a rear-projection screen, the rear-projection screen displaying projection images formed from an optical system, the fabrication method comprising the steps of:
providing a light source and a lenticular lens sheet;
forming a simulated path according to the actual projection path created by the optics configuration of the optical system;
propagating light along the simulated path and projecting the light onto lenticular portions of the lenticular lens sheet to make one surface of the lenticular lens sheet opposite to the lenticular portions have a plurality of bright and dark areas located thereon;
detecting the locations of the bright and dark areas on the surface of the lenticular lens sheet opposite to the lenticular portions by a light-sensing device; and
spreading an opaque material on the dark areas, but not on the bright areas.

8. The fabrication method as recited in claim 7, wherein the light source includes a Fresnel lens for paralleling the light.

9. The fabrication method as recited in claim 7, wherein the optical system is a projection system for a rear-projection TV.

10. The fabrication method as recited in claim 7, wherein the light-sensing device is a charge-coupled device (CCD).

11. The fabrication method as recited in claim 7, wherein the light-sensing device is a photo-detector (PD).

12. The fabrication method as recited in claim 7, wherein the light-sensing device receives the light passing through the lenticular lens sheet to detect the locations of the bright and dark areas, and the light is focused by a lens set before entering the light-sensing device.

13. The fabrication method as recited in claim 7, wherein the opaque material is ink and the ink is spread on the dark areas by an inkjet device.

14. A fabrication method for a rear-projection screen, comprising the steps of:
providing a light source and a lenticular lens sheet;
projecting a light generated from the light source onto lenticular portions of a lenticular lens sheet to make one surface of the lenticular lens sheet opposite to the lenticular portions have a plurality of bright and dark areas located thereon;
detecting the locations of the bright and dark areas on the surface of the lenticular lens sheet opposite to the lenticular portions by a light-sensing device; and
spreading an opaque material on the dark areas, but not on the bright areas by an inkjet device.

* * * * *